(12) United States Patent
Keshavan et al.

(10) Patent No.: US 11,624,288 B2
(45) Date of Patent: Apr. 11, 2023

(54) SLOTTED CERAMIC COATING WITH A REACTIVE PHASE COATING DISPOSED THEREON FOR IMPROVED CMAS RESISTANCE AND METHODS OF FORMING THE SAME

(71) Applicant: General Electric Company, Schenectady, NY (US)

(72) Inventors: Hrishikesh Keshavan, Watervliet, NY (US); Byron Andrew Pritchard, Cincinnati, OH (US); Cathleen Ann Hoel, Schenectady, NY (US); Ambarish Jayant Kulkarni, Glenville, NY (US); Michael Solomon Idelchik, Niskayuna, NY (US); Bernard Patrick Bewlay, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 925 days.

(21) Appl. No.: 15/865,495

(22) Filed: Jan. 9, 2018

(65) Prior Publication Data
US 2019/0211696 A1    Jul. 11, 2019

(51) Int. Cl.
*C23C 28/00* (2006.01)
*F01D 5/28* (2006.01)
(Continued)

(52) U.S. Cl.
CPC ............ *F01D 5/288* (2013.01); *B23K 26/364* (2015.10); *C23C 4/11* (2016.01); *C23C 28/3215* (2013.01);
(Continued)

(58) Field of Classification Search
None
See application file for complete search history.

(56) References Cited

U.S. PATENT DOCUMENTS 5,558,922 A * 9/1996 Gupta ................. C23C 14/5873
428/167
6,010,746 A    1/2000 Descoteaux et al.
(Continued)

FOREIGN PATENT DOCUMENTS

EP    1484427 A2    12/2004
WO    2015/116300 A2    8/2015

OTHER PUBLICATIONS

Rai et al, CMAS-Resistant Thermal Barrier Coatings (TBC), International Journal of Applied Ceramic technology, vol. 7, Issue: 5, pp. 662-674, May 11, 2009.
(Continued)

*Primary Examiner* — Mary I Omori
(74) *Attorney, Agent, or Firm* — Dority & Manning, P.A.

(57) ABSTRACT

A coated component including a slotted ceramic coating with a reactive phase coating disposed thereon for improved resistance to environmental contaminant compositions, along with methods of its formation, is provided. The coated component may include a substrate defining a surface, a ceramic coating disposed on the surface of the substrate, and a reactive phase coating disposed on the layer of environmental contaminant compositions. The ceramic coating includes a plurality of slots disposed in the ceramic coating forming segments of ceramic coating material.

20 Claims, 9 Drawing Sheets

(51) Int. Cl.
*B23K 26/364* (2014.01)
*F01D 25/00* (2006.01)
*C23C 4/11* (2016.01)
*F01D 5/00* (2006.01)

(52) U.S. Cl.
CPC .......... *C23C 28/3455* (2013.01); *F01D 5/005* (2013.01); *F01D 5/284* (2013.01); *F01D 25/007* (2013.01); *F05D 2230/90* (2013.01); *F05D 2300/611* (2013.01)

(56) References Cited

U.S. PATENT DOCUMENTS

| | | | |
|---|---|---|---|
| 6,465,090 | B1 | 10/2002 | Stowell et al. |
| 8,356,482 | B2 | 1/2013 | Duval et al. |
| 8,470,460 | B2 | 6/2013 | Lee |
| 10,329,917 | B2 | 6/2019 | Quitter |
| 2003/0221315 | A1 | 12/2003 | Baumann et al. |
| 2005/0282020 | A1* | 12/2005 | Stowell .............. C23C 28/3215 427/446 |
| 2007/0160859 | A1* | 7/2007 | Darolia ................ C23C 28/321 428/472 |
| 2009/0017260 | A1* | 1/2009 | Kulkarni .............. C23C 28/36 428/161 |
| 2009/0110953 | A1* | 4/2009 | Margolies ............ C23C 28/321 428/621 |
| 2009/0169752 | A1 | 7/2009 | Fu et al. |
| 2009/0252985 | A1 | 10/2009 | Bangalore et al. |
| 2011/0097538 | A1* | 4/2011 | Bolcavage .............. F01D 11/08 264/129 |
| 2016/0115818 | A1 | 4/2016 | Porob et al. |
| 2016/0115819 | A1 | 4/2016 | Nayak et al. |
| 2016/0168684 | A1* | 6/2016 | Brosnan .............. B05D 3/0254 428/305.5 |
| 2017/0321559 | A1 | 11/2017 | Chapman et al. |
| 2018/0154392 | A1* | 6/2018 | Keshavan .............. C23C 24/04 |
| 2018/0290929 | A1 | 10/2018 | Clark et al. |
| 2018/0371923 | A1* | 12/2018 | Johnson ................ F01D 25/12 |

OTHER PUBLICATIONS

Senturk et al., "CMAS-Resistant Plasma Sprayed Thermal Barrier Coatings Based on Y2O3-Stabilized ZrO2 with Al3+ and Ti4+ Solute Additions", Journal of Thermal Spray Technology, vol. 23, Issue:4, pp. 708-715, Apr. 2014.

Wu et al., "Evaluation of Plasma Sprayed YSZ thermal Barrier Coatings with the CMAS Deposits Infiltration using Impedance Spectroscopy", Progress in Natural Science: Materials International, vol. 22, Issue:1, pp. 40-47, Feb. 2012.

Johnson et al.; "Slotted Ceramic Coatings for Improved CMAS Resistance and Methods of Forming the Same"; Pending U.S. Appl. No. 15/634,196, filed Jun. 27, 2017; 33 Pages.

Keshavan et al., "CMAS Barrier Coating and Method of Applying the Same", Pending U.S. Appl. No. 15/370,447, filed Dec. 6, 2016.

* cited by examiner

SLOTTED CERAMIC COATING WITH A REACTIVE PHASE COATING DISPOSED THEREON FOR IMPROVED CMAS RESISTANCE AND METHODS OF FORMING THE SAME

BACKGROUND

Embodiments of the present invention generally relate to ceramic coatings (e.g., thermal barrier coatings) and to a protective coating that is reactive to environmental contaminant compositions disposed on top of a thermal barrier coating, for components of turbomachinery, such as gas turbine engines.

Ceramic coatings, and more particularly thermal barrier coatings ("TBC"), are typically used in articles that operate at or are exposed to high temperatures. Aviation turbines and land-based turbines, for example, may include one or more components protected by the thermal barrier coatings. Under normal conditions of operation, coated components may be susceptible to various types of damage, including erosion, oxidation, and attack from environmental contaminants.

The efficiency of a combustion turbine engine improves as the firing temperature of the combustion gas is increased. As the firing temperatures increase, improved high temperature durability of the turbine components is needed. Nickel and cobalt based superalloy materials are now used extensively for components in the hot gas flow path such as combustor liners and combustor transition pieces, and turbine rotating and stationary blades (directionally solidified and single crystal). However, even these most recent superalloys are not capable of surviving long-term operation at temperatures which can sometimes exceed 1400° C. In many applications, a metal substrate is coated with a TBC ceramic insulating material in order to reduce the service temperature of the underlying metallic segments of the components.

The strain tolerance of TBC's used in gas turbine engines is increased by the use of through-thickness pores and cracks within the TBC produced by air plasma spray (APS) methods and the use of columnar TBCs produced by electron beam physical vapor deposition (EBPVD) methods.

Gas temperatures in the high pressure turbine section of gas turbine engines have increased in recent years, and as a result the ceramic TBCs become increasingly vulnerable to attack by molten deposits resulting from the ingestion of siliceous particulates (E.g., dust, sand, volcanic ash, debris) with the intake of air. Even when particle removal strategies are utilized, small diameter particles are still able to reach the turbine section, where they melt, and infiltrate through its interconnected network of inter-columnar pores.

More particularly, environmental contaminate compositions, such as dust containing some combinations of calcium-magnesium-alumino-silicate (CMAS), is often ingested into the hot sections of gas turbine engines. The dust can deposit on components in the engine and, due to the high surrounding temperatures, can become molten. For turbine components, environmental contaminant compositions of particular concern are those containing oxides of calcium, magnesium, aluminum, silicon, and mixtures thereof; dirt, ash, and dust ingested by gas turbine engines, for instance, are often made up of such compounds. These oxides often combine to form contaminant compositions comprising mixed calcium-magnesium-aluminum-silicon-oxide systems (Ca—Mg—Al—Si—O), hereafter referred to as "CMAS." At the high turbine operating temperatures, these environmental contaminants can adhere to the hot thermal barrier coating surface, and thus cause damage to the thermal barrier coating. For example, CMAS can form compositions that are liquid or molten at the operating temperatures of the turbines. The molten CMAS composition can dissolve the thermal barrier coating, or can fill its porous structure by infiltrating the pores, channels, cracks, or other cavities in the coating. Upon cooling, the infiltrated CMAS composition solidifies and reduces the coating strain tolerance, thus initiating and propagating cracks that may cause delamination and spalling of the coating material. This may further result in partial or complete loss of the thermal protection provided to the underlying metal substrate of the part or component. Further, spallation of the thermal barrier coating may create hot spots in the metal substrate leading to premature component failure. Premature component failure can lead to unscheduled maintenance as well as parts replacement resulting in reduced performance, and increased operating and servicing costs.

Further, with CMAS infiltration, the stresses that are generated in the TBC can cause early spallation of the coating. Spallation of the TBC creates hot spots in the metal substrate leading to reduction in component life. The spallation in turn leads to unscheduled maintenance as well as parts replacement resulting in increased operating costs and increased servicing costs.

Routine maintenance of a TBC includes stripping and reapplying the TBC material onto the component. Such operations require either engine disassembly or a component stripping process such that a new TBC can be applied onto the surface of the component(s). Such a disassembly processes, causes downtime in the engine leading to loss of service for extended periods of time. Alternatively, flushing the internal components of the engine with detergents and other cleaning agents can introduce other unwanted issues to the engine.

Thus, an improved design of a TBC coated metal component, particularly a component for gas turbine engines, and a process to extend the life of TBC coatings, especially for continued operation of the hot section components of a gas turbine engine is desirable in the art.

BRIEF DESCRIPTION

Aspects and advantages of the present disclosure will be set forth in part in the following description, or may be obvious from the description, or may be learned through practice of the disclosure.

Briefly, in accordance with one aspect of the present technique, a component including a slotted ceramic coating with a reactive phase coating disposed thereon is generally provided, along with methods of its formation, restoration, and use.

In accordance with an exemplary embodiment, disclosed is a coated component, including a substrate defining a surface, a ceramic coating disposed on the surface of the substrate and a reactive phase coating disposed along the ceramic coating. The ceramic coating comprises a plurality of slots disposed in the ceramic coating forming a plurality of segments of ceramic coating material.

In accordance with yet another exemplary embodiment, disclosed is a method of forming a coated component. The method including the forming a ceramic coating along a surface of a substrate, applying a reactive material along the ceramic coating to form a reactive phase coating and forming a plurality of slots along the ceramic coating one of prior to or subsequent to applying the reactive material. The plurality of slots forming segments of ceramic coating material.

Other objects and advantages of the present disclosure will become apparent upon reading the following detailed description and the appended claims with reference to the accompanying drawings. These and other features and improvements of the present application will become apparent to one of ordinary skill in the art upon review of the following detailed description when taken in conjunction with the several drawings and the appended claims.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure in which like characters represent like parts throughout the drawings, wherein.

Figure 1:
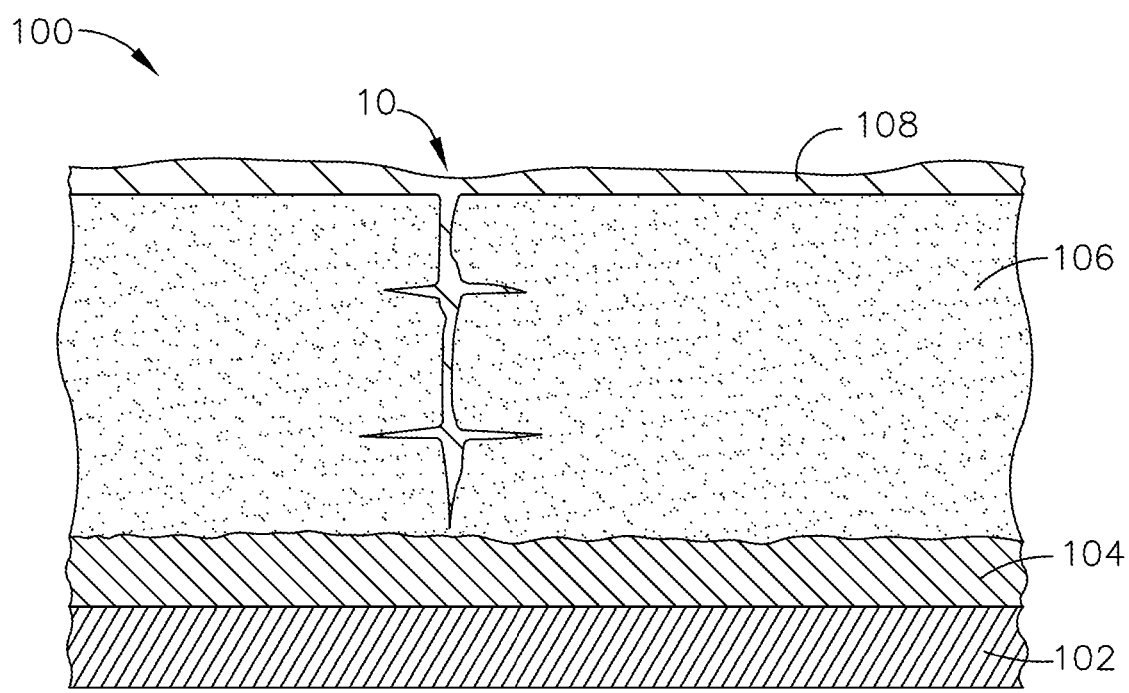
FIG. 1 is a simplified cross-section of a ceramic coating layer having crack formed therein and a layer of environmental contaminant composition formed thereon an uppermost surface and into the crack, in accordance with known prior art.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

It is noted that the drawings as presented herein are not necessarily to scale. The drawings are intended to depict only typical aspects of the disclosed embodiments, and therefore should not be considered as limiting the scope of the disclosure. Repeat use of reference characters in the present specification and drawings is intended to represent the same or analogous features or elements of the present disclosure.

DETAILED DESCRIPTION

Reference now will be made in detail to embodiments of the disclosure, one or more examples of which are illustrated in the drawings. Each example is provided by way of explanation of the disclosure, not limitation of the disclosure. In fact, it will be apparent to those skilled in the art that various modifications and variations can be made in the present disclosure without departing from the scope or spirit of the invention. For instance, features illustrated or described as part of one embodiment can be used with another embodiment to yield a still further embodiment. Thus, it is intended that the present disclosure covers such modifications and variations as come within the scope of the appended claims and their equivalents.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Approximating language, as used herein throughout the specification and claims, is applied to modify any quantitative representation that could permissibly vary without resulting in a change in the basic function to which it is related. Unless otherwise indicated, approximating language, such as "generally," "substantially," and "about," as used herein indicates that the term so modified may apply to only an approximate degree, as would be recognized by one of ordinary skill in the art, rather than to an absolute or perfect degree. Accordingly, a value modified by such term is not to be limited to the precise value specified. In at least some instances, the approximating language may correspond to the precision of an instrument for measuring the value. Here and throughout the specification and claims, range limitations are combined and interchanged. Such ranges are identified and include all the sub-ranges contained therein unless context or language indicates otherwise.

As used herein, the term "coating" refers to a material disposed on at least a portion of an underlying surface in a continuous or discontinuous manner. Further, the term "coating" does not necessarily mean a uniform thickness of the disposed material, and the disposed material may have a uniform or a variable thickness. The term "coating" may refer to a single layer of the coating material or may refer to a plurality of layers of the coating material. The coating material may be the same or different in the plurality of layers.

In the present disclosure, when a layer is being described as "on" or "over" another layer or substrate, it is to be understood that the layers can either be directly contacting each other or have another layer or feature between the layers, unless expressly stated to the contrary. Thus, these terms are simply describing the relative position of the layers to each other and do not necessarily mean "on top" of since the relative position above or below depends upon the orientation of the device to the viewer.

Chemical elements are discussed in the present disclosure using their common chemical abbreviations, such as commonly found on the periodic table of elements. For example, hydrogen is represented by its common chemical abbreviation H; helium is represented by its common chemical abbreviation He; and so forth.

As used herein, the term "fusion temperature" refers to the degree of temperature at which a substance starts to melt (i.e., the incipient melting point). Since these materials generally have a complex, multi-component range of compositions, this fusion temperature could be measurably lower than the temperature at which a single-phase liquid zone would be realized.

A coated component is generally provided that includes a layered structure including an improved ceramic coating with local slotting and a protective coating system disposed thereon to protect the underlying material (e.g., underlying coating and/or surface) from undesired chemical interactions. The layered structure has an improved balance of thermal strain tolerance, environmental resistance, and heat transfer performance in the distress zones of components, such as combustors, airfoils, heat shields, etc. The improved ceramic coating is provided with local slotting for improved coating durability. The coating system disposed thereon the slotted, improved ceramic coating, generally includes a reactive phase coating positioned on any layer of environmental contaminant compositions present on the surface of the improved ceramic coating.

As used herein, the term "layer of environmental contaminant compositions" refers to a contamination layer formed during use of the component. The layered structure as described herein has improved environmental resistance, to such environmental contaminant compositions, and in particular molten dust that forms during operation of the turbine engine at high operating temperatures. The molten dust typically includes some combination of, CaO—MgO—$Al_2O_3$—$SiO_2$ commonly known as CMAS; small amounts of other oxides are often present in the molten composition as well, as is understood in the art.

The present structure includes local and tailored slotting into the improved ceramic coating that creates segments of ceramic coating material. For example, the ceramic coating may be a thermal barrier coating (TBC) such as used on metallic components, including metal alloy components and superalloy components. One particularly suitable TBC material includes, for example, yttria-stabilized zirconia (YSZ), but is not limited to any particular ceramic.

The segmented ceramic coating material, in combination with the reactive phase coating, provides a balance of CMAS resistance and heat transfer resistance. The approach can be applied to a variety of components, such as combustors, blades, nozzles, heat shields, etc.

The reactive phase coating generally protects the underlying improved ceramic coating from CMAS attack by reacting with the existing layer of environmental contaminant compositions on its surface and/or by reacting with additional environmental contaminant composition deposits formed on the reactive phase coating after subsequent use of the component (e.g., after operation of an engine containing the component). The reactive phase coating is useful on coating systems that include a thermal barrier coating in new make components prior to field exposure and provides protection to the underlying coating from dust contaminants. In addition, the reactive phase coating is useful on coating systems that include a thermal barrier coating on components after having been placed in service, such as when performing repair of components, either on-wing or off, and may include a plurality of surface-connected voids, such as cracks and porosity, which provides a path from CMAS attack, reactive particle attack, or reactive layer attack.

FIG. 1 illustrates a component 100 including a conventional crack 10 formed in a coating 106, and is labeled "Prior Art". As shown in FIG. 1, the component 100 includes a substrate 102, a bond coat 104, a ceramic coating (TBC) 106, and a layer 108 of environmental contaminant compositions, and more particularly, a layer of CMAS. The conventional crack 10 is completely filled by the molten environmental contaminant compositions (e.g. CMAS), reducing the strain tolerance of the TBC 106.

FIGS. 2-5 illustrate in cross-section alternate embodiments of a coated component according to the disclosure. It should be understood that like elements have like numbers throughout the disclosed embodiments. Accordingly, similar to the previous embodiment of FIG. 1, each of the coated components of FIGS. 2-5 includes a substrate 102, a bond coat 104, a ceramic coating 106, including a plurality of slots 110 formed therein (of which only one is illustrated) and a reactive phase coating 112. The ceramic coating 106 will be described and referred to throughout the embodiments disclosed herein as a TBC.

Figure 2:
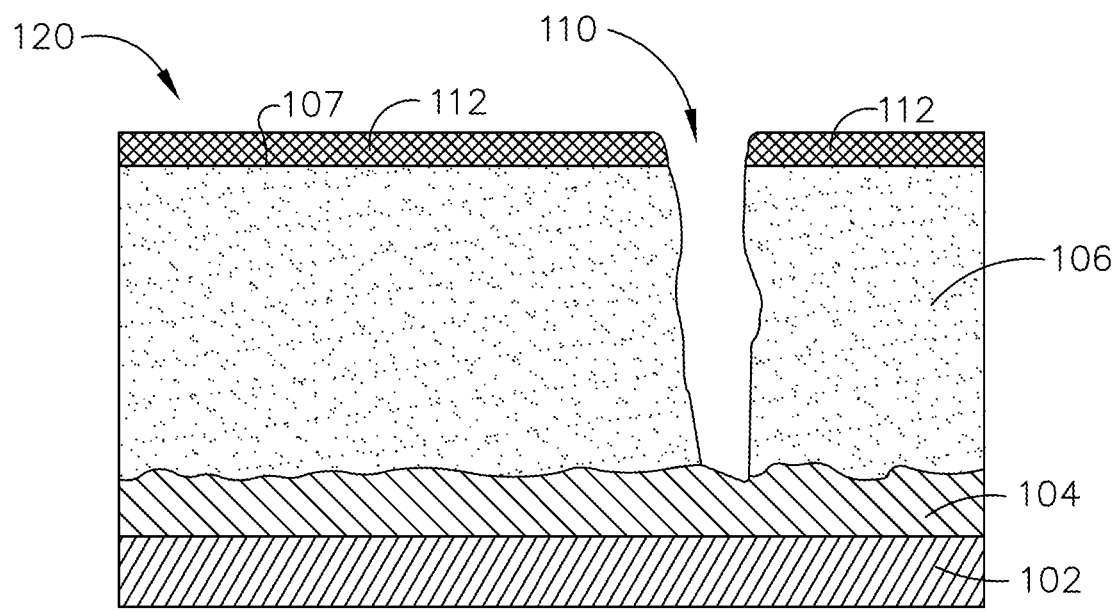
FIG. 2 is a simplified cross-section of a ceramic coating layer having a slot formed therein and a reactive phase coating layer disposed thereon an uppermost surface, in accordance with one or more embodiments shown or described herein.
Figure 3:
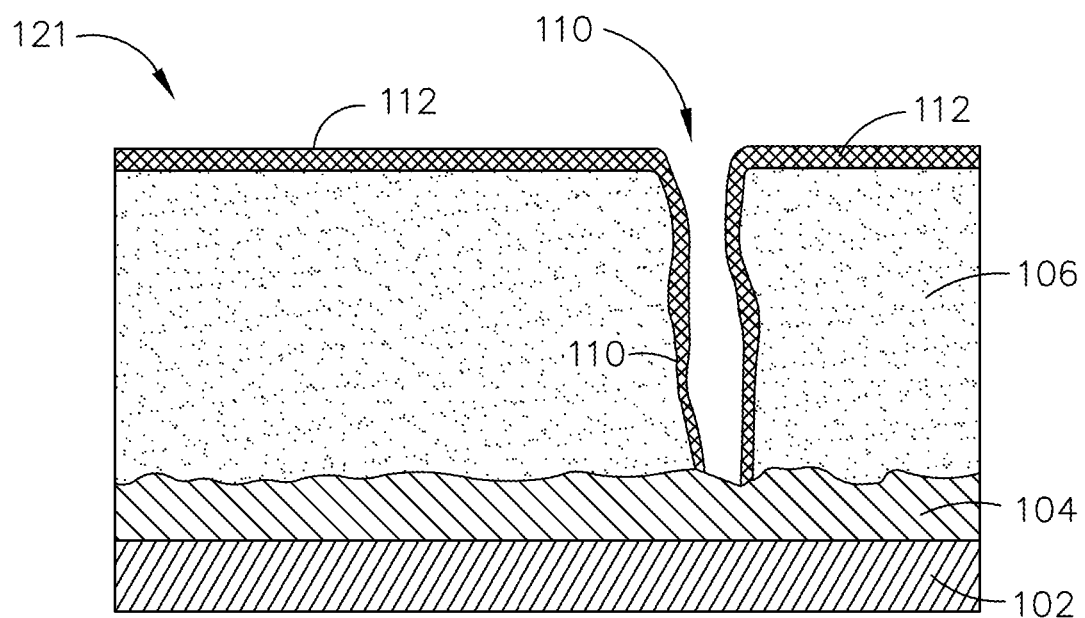
FIG. 3 is a simplified cross-section of a ceramic coating layer having a slot formed therein and a reactive phase coating layer disposed thereon an uppermost surface and extending onto the slot surface, in accordance with one or more embodiments shown or described herein.
Figure 4:
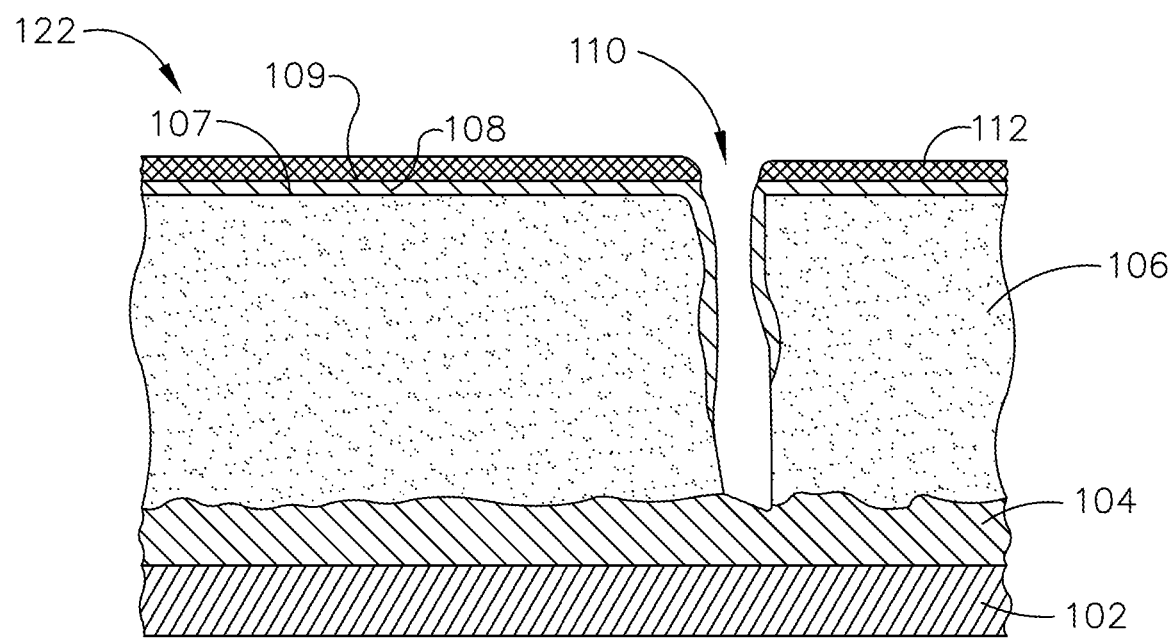
FIG. 4 is a simplified cross-section of a ceramic coating layer having a slot formed therein and a reactive phase coating layer disposed thereon an uppermost surface of a layer of environmental contaminants formed on the ceramic coating layer, in accordance with one or more embodiments shown or described herein.
Figure 5:
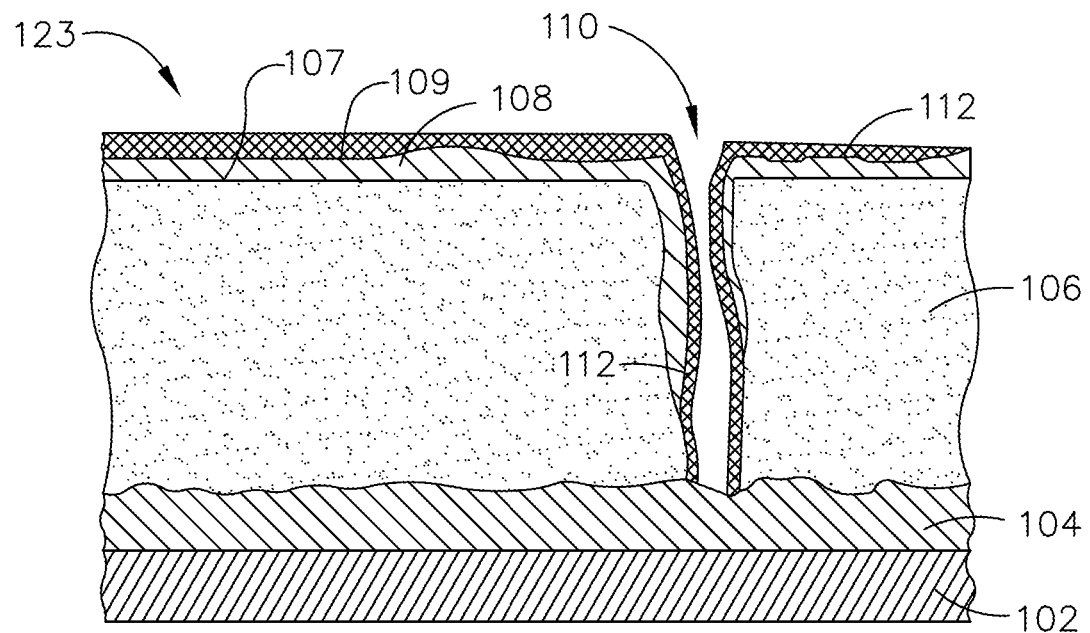
FIG. 5 is a simplified cross-section of a ceramic coating layer having a slot formed therein and a reactive phase coating layer disposed thereon an uppermost surface of a layer of environmental contaminants formed on the ceramic coating layer and extending onto the layer of environmental contaminants formed on the slot surface, in accordance with one or more embodiments shown or described herein.

More specifically, in the embodiment of FIGS. 2 and 3 illustrated are coated components wherein the reactive phase coating 112 is deposited directly on an outer surface 107 of the ceramic coating 106, such as on a new-make component that has not been placed into service and thus prior to any CMAS dust deposition or on a component for repair where the TBC has been stripped and recoated. In the embodiment of FIGS. 4 and 5 illustrated are coated components wherein the reactive phase coating 112 is deposited on a layer of CMAS 108 that has formed on the outer surface 107 of the ceramic coating 106, such as on a component that has been placed into service, when performing an on-wing repair.

In the embodiment of FIG. 2, illustrated is a coated component 120 wherein the reactive phase coating 112 is disposed on the ceramic coating 106, prior to slotting. More particularly, the reactive phase coating 112 is disposed on an outer surface 107 of the ceramic coating 106. Subsequent to deposition, slotting through the reactive phase coating 112 and ceramic coating 106 takes place, thus the reactive phase coating 112 is not formed on that portion of the ceramic coating 106 that is exposed in the slot 110. In the embodiment of FIG. 3, illustrated is a coated component 121 wherein the reactive phase coating 112 is disposed on the ceramic coating 106, subsequent to slotting of the ceramic coating 106, and thus disposed on an outer surface 107 of the ceramic coating 106 and on that portion of the ceramic coating 106 that is exposed in the slot 110. Depositing of the reactive phase coating 112 on the outer surface 107 of the ceramic coating 106 and on that portion of the ceramic coating 106 that is exposed in the slot 110 provides additional surface area available for the reactive phase coating 112 to react with environmental contaminant compositions providing additional CMAS resistance.

In the embodiment of FIG. 4, illustrated is a coated component 122 wherein the reactive phase coating 112 is disposed on an outer surface 109 of the layer 108 of environmental contaminant compositions such as performed in an on-wing repair. In this embodiment, the reactive phase coating 112 is not deposited on that portion of the layer 108 of environmental contaminant compositions that extends into the slot 110, although it is noted some overspray may direct the reactive phase coating 112 into at least a portion of the slot 110. In the embodiment of FIG. 5, illustrated is a coated component 123 wherein the reactive phase coating 112 is disposed on the outer surface 109 of the layer 108 of environmental contaminant compositions, such as performed in an on-wing repair. In this embodiment, the reactive phase coating 112 extends onto that portion of the layer 108 of environmental contaminant compositions that extends into the slot 110.

Referring still to FIGS. 2-5, the TBC 106 as illustrated includes the slots 110 formed therein in accordance with the embodiments of the present disclosure, as will be described presently. As previously indicated, in one embodiment, the slots 110 are formed prior to the deposition of the reactive phase coating 112, such as in repair of components, on-wing repair of components or in new-make components. In another embodiment, the slots 110 are formed subsequent to the deposition of the reactive phase coating 112, such as in new-make components or repair of components where the ceramic coating 108 has been stripped away and the component recoated with TBC. In the illustrated embodiments, the TBC includes a single layer of TBC material. However, in other embodiments, multiple layers may be utilized to form the TBC 106. The slots 110 may traverse the one or more layers of TBC material. The TBC 106 may have a total thickness of about 100 microns to about 2500 microns, such as about 250 microns to about 700 microns.

In contrast to the embodiment of FIG. 1, in the embodiments of FIGS. 2-5, the configuration of the slots 110 and the addition of the reactive phase coating 112, any subsequently deposited environmental contaminant compositions do not completely fill the slots 110. The molten environmental contaminant compositions (e.g. CMAS) can infiltrate into the slots 110, however, due at least in part to the geometry and width of the slots 110 and a thickness of the reactive phase coating 112 (described presently), the environmental contaminant compositions cannot bridge the slots 110. The configuration of the slots 110 reduces capillary forces that may pull the environmental contaminant compositions (e.g. CMAS) into the slot, and possibly below the melting isotherm. Low in-plane modulus is maintained and in-plane compliance of the TBC in the plane perpendicular to the slots 110 may be retained. The slots 110 may also prevent or delay large area spallation by acting as "crack-stoppers" preventing the formation of delamination cracks.

Figure 6:
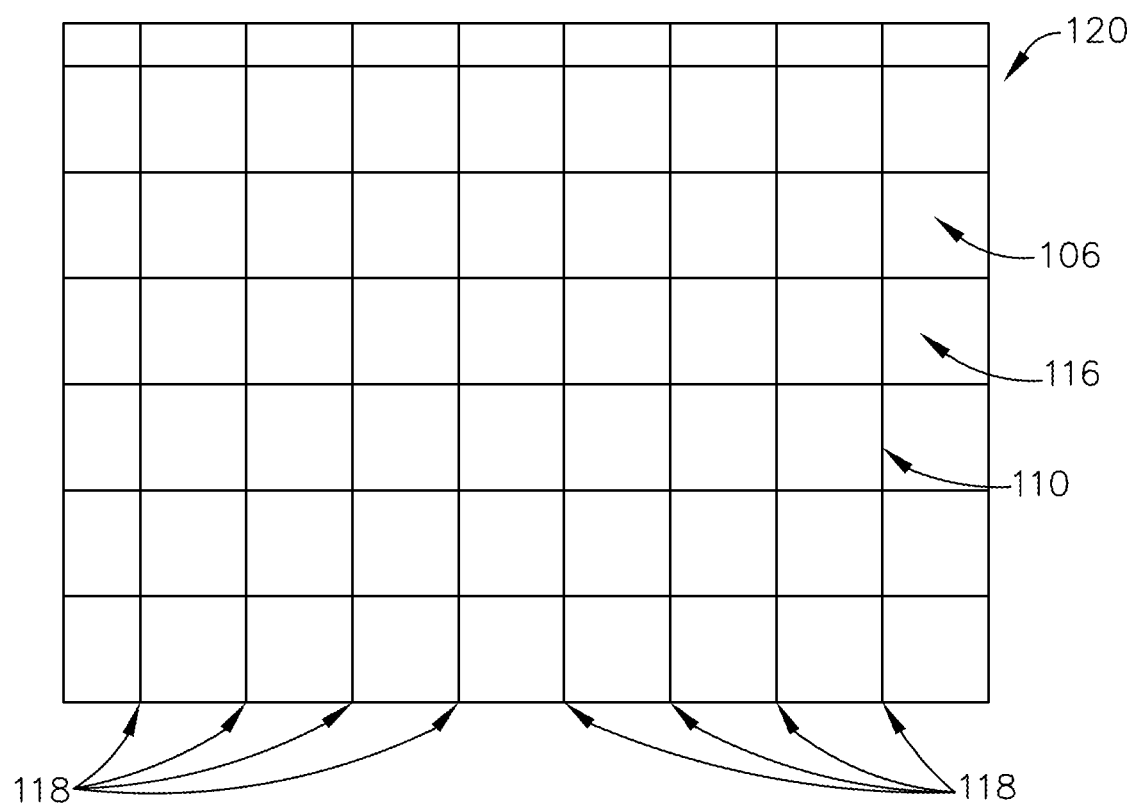
FIG. 6 illustrates a plan view of a plurality of slots in a ceramic coating layer, in accordance with one or more embodiments shown or described herein.

Referring now to FIG. 6, illustrated is a plurality of slots 110 formed in a TBC 106, according to an embodiment. In particular, FIG. 6 shows a TBC coated substrate with a plurality of slots 110 disposed in the TBC 106, prior to deposition of the reactive phase coating 112. In one embodiment, the slots may be disposed in any pattern, without regard for the location of the cooling holes or other features in the substrate. In the exemplary embodiment of FIG. 6, the plurality of slots 110 are disposed in a grid pattern forming segments 116 of TBC material on the surface of the substrate, with the slots 110 being disposed in nominally parallel and perpendicular directions (approximately 0°/90° angles). The segments 116 can have a range of cross-sections, including square, hexagon, octagon, etc. such as to provide the required level of in-plane compliance, or in the alternative, non-linear shaped slots. The slots 110 may be produced by cutting with a high-speed saw, a laser system, abrasive water jet, or combinations thereof. A plurality of slots 110 may form an array 118 of slots 110 traversing the TBC 106. Each slot 110 may extend for the length of the surface of the TBC 106. In most embodiments, each slot 110 has a length of that is about 1 cm or longer (e.g., 1 cm to the end of the surface of the TBC 106).

Figure 7:
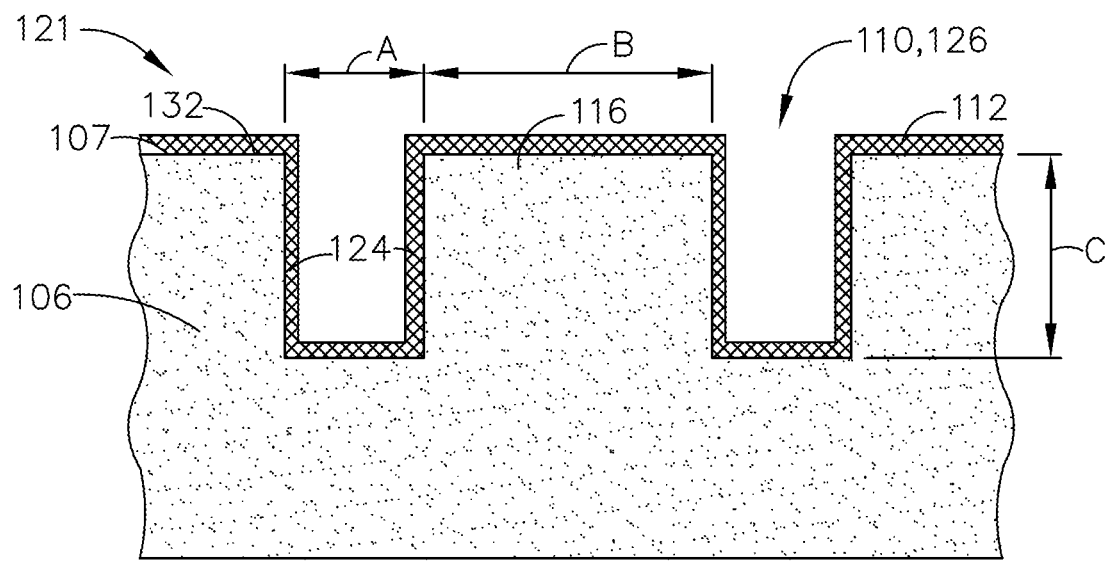
FIG. 7 illustrates an exemplary embodiment of a ceramic coating layer including a plurality of parallel-sided slots and having a reactive phase coating layer disposed on a ceramic coating layer, in accordance with one or more embodiments shown or described herein.
Figure 8:
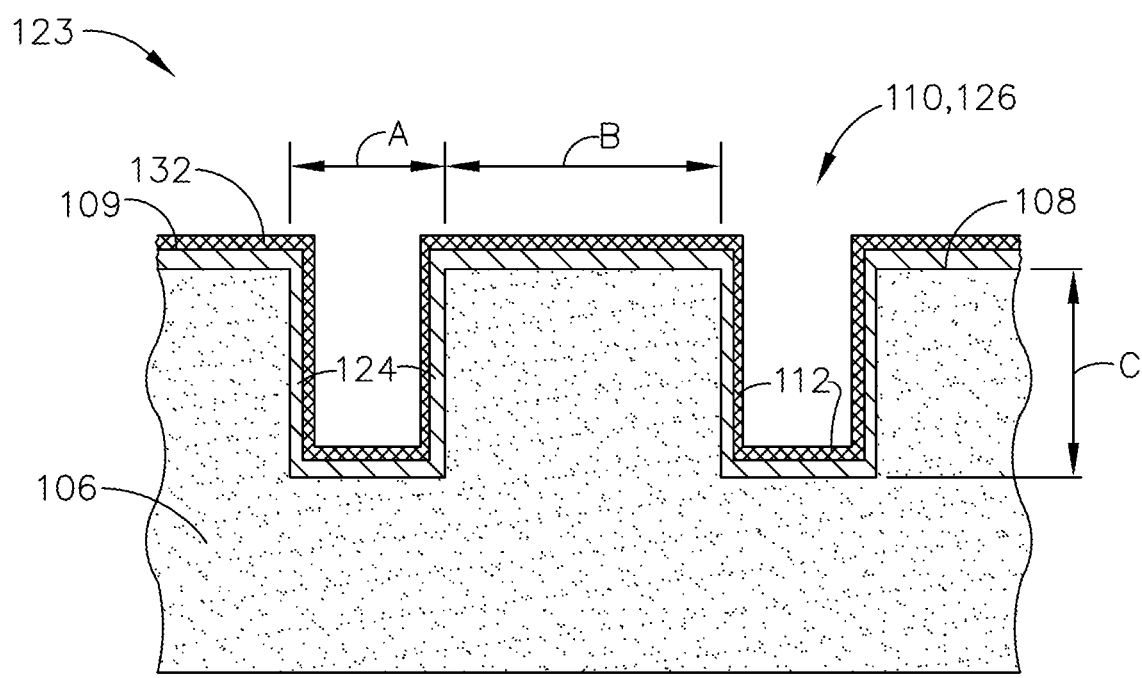
FIG. 8 illustrates another exemplary embodiment of a ceramic coating layer including a plurality of parallel-sided slots and having a reactive phase coating layer disposed on a layer of environmental contaminant compositions formed on a ceramic coating layer, in accordance with one or more embodiments shown or described herein.
Figure 9:
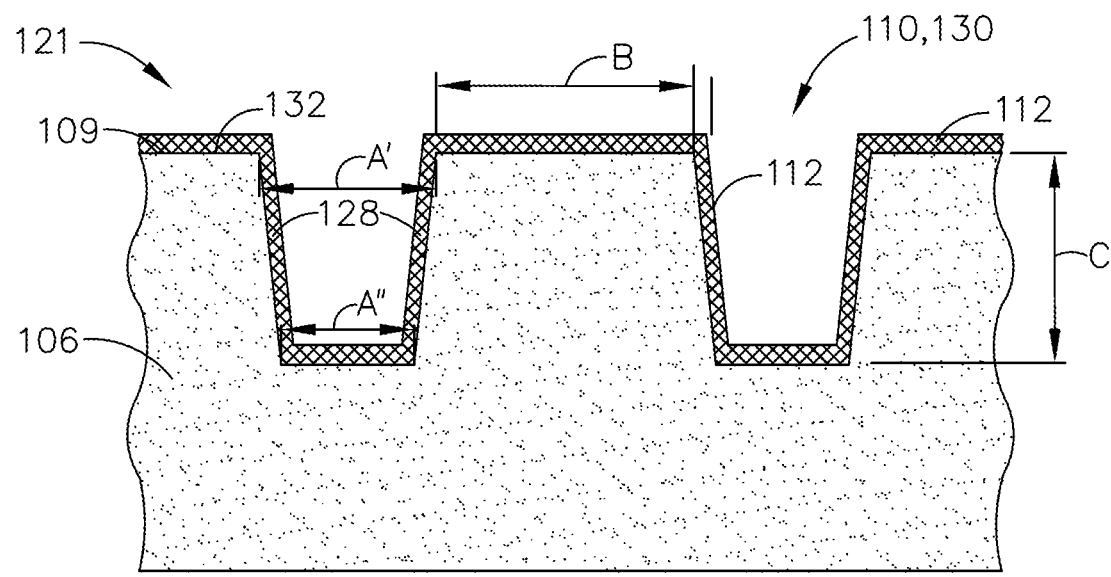
FIG. 9 illustrates an exemplary embodiment of a ceramic coating layer including a plurality of U-shaped slots and having a reactive phase coating layer disposed on a ceramic coating layer, in accordance with one or more embodiments shown or described herein.
Figure 10:
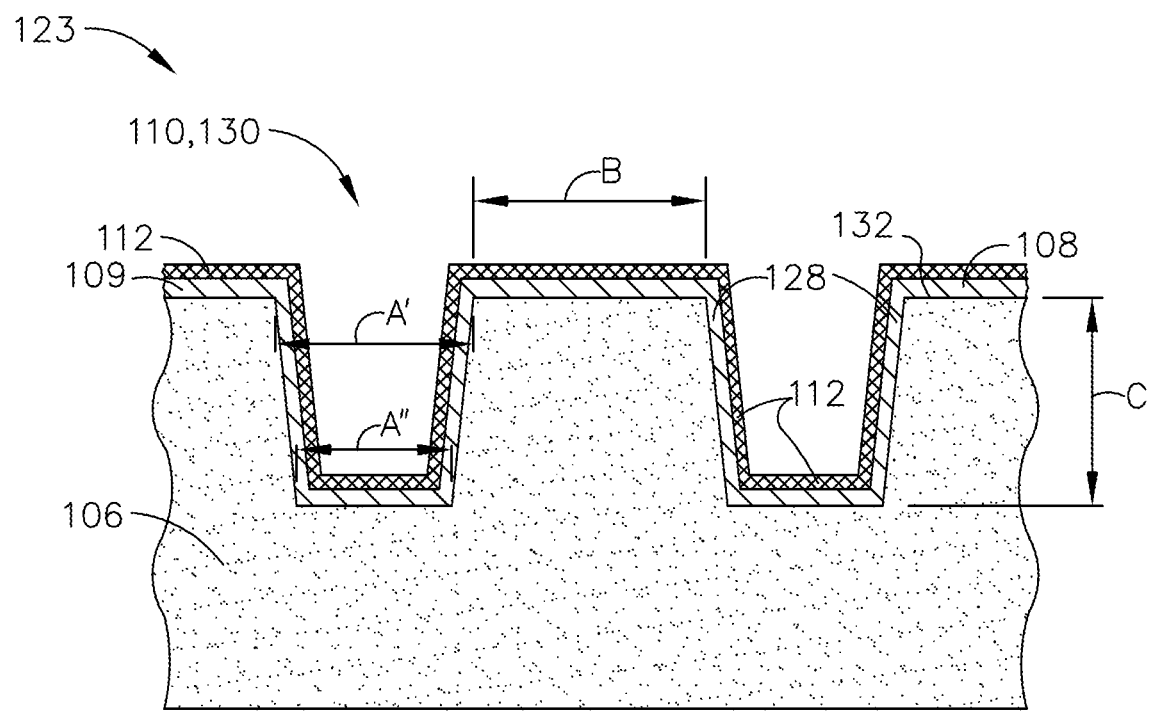
FIG. 10 illustrates another exemplary embodiment of a ceramic coating layer including a plurality of U-shaped slots and having a reactive phase coating layer disposed on a layer of environmental contaminant compositions formed on a ceramic coating layer, in accordance with one or more embodiments shown or described herein.

Referring now to FIGS. 7-10, illustrated in cross-section are portions of components 121, 123, respectively, illustrating the TBC 106 having formed therein alternate geometries of the slots 110. As previously indicated, various geometries of the slots 110 are available. In the embodiments of FIGS. 7 and 8, the slots 110 are formed having a parallel sided profile with an aspect ratio (depth/width) greater than 4 (e.g., about 4 to about 10). In the embodiments of FIGS. 9 and 10, the slots 110 may be formed to have a V-shaped and/or U-shaped profile. It should be understood that the terms V-shaped and U-shaped describe the general geometry of the slots 110, while allowing for variations within the actual shape so as to not be a perfect V or U shape, respectively. The V-shape and/or U-shape may reduce the rate at which the closure of the slot 110 may occur due to environmental contaminant compositions (e.g. CMAS) build up on the sides of the slot 110 during operation.

Referring more specifically to FIGS. 7 and 8, illustrated is the TBC 106 of the component 121, 123, respectively, wherein the plurality of slots 110 are defined by a plurality of parallel sides 124, thereby forming a plurality of parallel-sided slots 126. More particularly, in the embodiments of FIGS. 7 and 8, the TBC 106 is slotted (also referred to herein as segmented) to define the plurality of parallel sides 124, defining a width "A" of the slot 110, a width "B" of each TBC segment 116 and a depth "C" of the slot 110. In each of the illustrated embodiments, slotting of the ceramic coating 106 is performed prior to deposition of the reactive phase coating 112. In alternate embodiments, as previously disclosed, slotting may take place subsequent to the depositing of the reactive phase coating 112 on the ceramic coating 106.

The width "A" of the slot 110 may be designed to be sufficiently large to maintain desirably low capillary forces and to reduce risk of bridging of the slots with molten environmental contaminant compositions and the reactive phase coating 112, but small enough to not substantially affect the performance of the TBC 106. For example, the slot 110 may be about 10 µm to about 200 µm wide, such as about 10 µm to about 100 µm wide, about 15 µm to about 90 µm wide, or about 20 µm to about 80 µm wide. For instance, the slot 110 may be about 25 µm wide to about 75 µm wide to provide improved resistance to environmental contaminant compositions (E.G. CMAS) infiltration. Additionally, the slot 110 depth "C" may be designed to be sufficient to allow particles to deposit therein, but not reach the underlying substrate. For example, the slots 110 may have a depth of about 50 µm to about 1000 µm, such as about 100 µm to about 800 µm, or about 200 µm to about 700 µm. The aspect ratio (depth to width) of the slots 110 may be about 2 to about 50, such as about 3 to about 10, or about 5 to about 10. In an embodiment, it is preferred that the parallel-sided slot 126 have an aspect ratio greater than 4. The slots 110 may be spaced about 0.25 mm to about 3 mm apart, such as about 0.5 mm to about 2 mm apart, or about 0.5 mm to about 1.5 mm apart. For instance, the slots 110 may be spaced about 1 mm apart.

As best illustrated in the embodiment of FIG. 7, similar to the embodiment of FIG. 3, the reactive phase coating 112 is disposed on the outer surface 107 of the ceramic coating 106 and extends onto that portion of ceramic coating 106 exposed on the sidewalls 124. Depositing of the reactive phase coating 112 on the outer surface 107 of the ceramic coating 106 and on that portion of the ceramic coating 106 that is exposed on the sidewalls 124 provides additional surface area available for the reactive phase coating 112 to react with environmental contaminant compositions providing additional CMAS resistance. As best illustrated in the embodiment of FIG. 8, similar to the embodiment of FIG. 5, the reactive phase coating 112 is disposed on the outer surface 109 of the layer 108 of environmental contaminant compositions and extends onto that portion of the outer surface 109 of the layer 108 of environmental contaminant compositions in the parallel-sided slot 126, and more particularly on the layer 108 of environmental contaminant compositions formed on the sidewalls 124. Similar to the embodiment of FIG. 7, depositing of the reactive phase coating 112 on the outer surface 109 of the layer 108 of environmental contaminant compositions and onto that portion of the outer surface layer 108 of environmental contaminant compositions that is on the sidewalls 124 provides additional surface area available for the reactive phase coating 112 to react with environmental contaminant compositions providing additional CMAS resistance.

Referring now to FIGS. 9 and 10, illustrated is the TBC 106 of the components 121, 123, respectively, wherein the plurality of slots 110 are defined by a plurality of angled sidewalls 128, thereby forming a plurality of U-shaped slots 130. More particularly, in the embodiments of FIGS. 9 and 10, the TBC 106 is slotted to define the plurality of angled sides 128, defining a top width "A'" of the slot 130, a bottom width "A''" of the slot 130, a width "B" of each TBC segment 116, and a depth "C" of the slot 130, wherein A' is greater than A''. As best illustrated in the embodiment of FIG. 9, similar to the embodiment of FIG. 3, the reactive phase coating 112 is disposed on ceramic coating layer 106 including the angled sidewalls 128. Depositing of the reactive phase coating 112 on the ceramic coating layer 106 and on the sidewalls 128 provides additional surface area available for the reactive phase coating 112 to react with environmental contaminant compositions providing additional CMAS resistance. As best illustrated in the embodiment of FIG. 10, similar to the embodiment of FIG. 5, the reactive phase coating 112 is disposed on the outer surface 109 of the layer 108 of environmental contaminant compositions and extends onto that portion of the outer surface 109 of the layer 108 of environmental contaminant compositions in the slot 130, and more particularly on the layer 108 of environmental contaminant compositions formed on the angled sidewalls 128. Similar to the embodiment of FIG. 9, depositing of the reactive phase coating 112 on the layer 108 of environmental contaminant compositions and onto that portion of the layer 108 of environmental contaminant compositions that is on the sidewalls 128 provides additional surface area available for the reactive phase coating 112 to react with environmental contaminant compositions providing additional CMAS resistance.

In each of the disclosed embodiments, a thickness of the reactive phase coating 112 on a top portion 132 of each of the segments 116 of ceramic coating 104 and the sidewalls 124, 128 of the segments 116 is design specific. The reactive phase coating 112 must be sufficiently thick to provide CMAS resistance, but there is an upper limit to the thickness on the top portion 132 of each of the segments 116, and there is a different upper limit to the thickness on the sidewalls 124, 128 of the columnar segments to avoid bridging of the slots 110.

Figure 11:
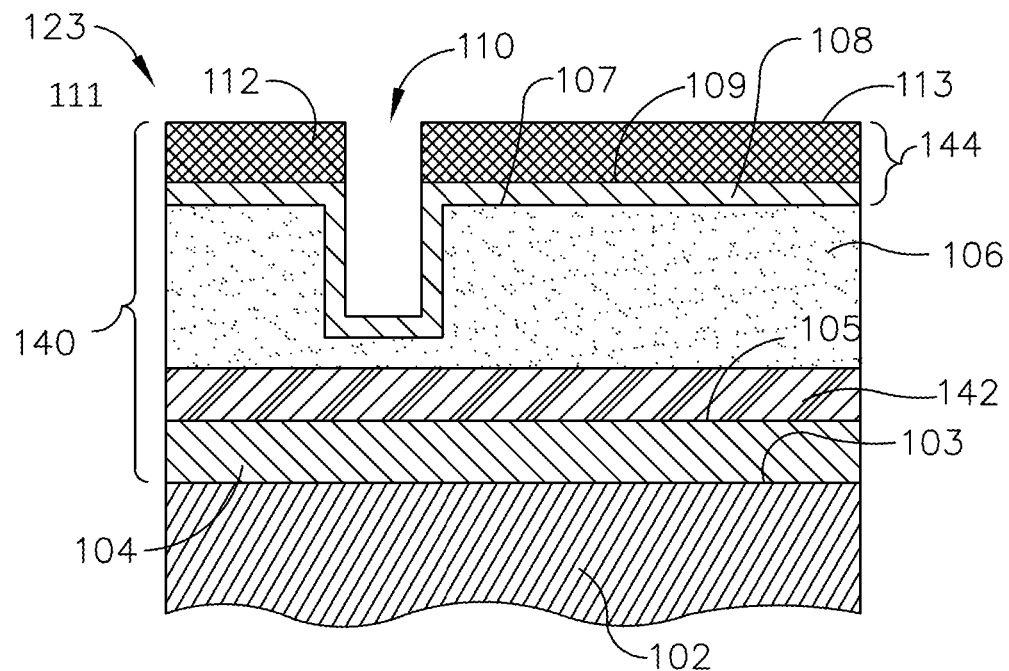
FIG. 11 illustrates an exemplary embodiment of a coated component including a plurality of slots formed in a ceramic coating layer and having a reactive phase coating layer disposed thereon a layer of environmental contaminant compositions formed on a ceramic coating layer, in accordance with one or more embodiments shown or described herein.

FIG. 11 is a schematic cross section of the coated component 123 of FIG. 5, but the description is similarly applicable to the coated components 120, 121, 122 previously presented. In particular embodiments, the coated component 123 may be any article that is subject to service in a high-temperature environment, such as a component of a gas turbine assembly. Examples of such components include, but are not limited to, components that include turbine airfoils such as blades and vanes, and combustion components such as liners and transition pieces. The coated component 123 is generally shown as including a substrate 102 having a surface 103.

As shown in FIG. 11, a coating system 140 is positioned on the surface 103 of the substrate 102. In the exemplary embodiment of FIG. 11, the coating system 140 includes the bond coat 104 on the surface 103 of the substrate 102, the TBC 106, and a protective coating 144 comprised of the layer 108 of environmental contaminant compositions on a surface 107 of the TBC 106, and the reactive phase coating 112 on the surface 109 of the layer 108 of environmental contaminant compositions. In an embodiment, the coating system 140, as illustrated, may further include a thermally grown oxide layer 142 on a surface 105 of the bond coat 104, so as to be disposed between the bond coat 104 and the TBC 106.

The substrate 102 may be any suitable material such as a metal, and more particularly a metal such as steel or superalloys (e.g., nickel-based superalloys, cobalt-based superalloys, or iron-based superalloys, such as Rene N5, N500, N4, N2, IN718, Hastelloy X, or Haynes 188) or other suitable materials for withstanding high temperatures, such as ceramic matrix composites. The TBC 106 may be disposed along one or more portions of the substrate 102 or disposed substantially over the whole exterior of the substrate 102.

The bond coat 104 provides functionality (adhesion promotion and oxidation resistance, for example) similar to what such coatings generally provide in conventional applications. The bond coat 104 may be any suitable bond coat 104 for improving the adherence of the TBC 106 to the underlying substrate 102 and may be generally uniform underneath the TBC 106. In some embodiments, bond coat 104 comprises an aluminide, such as nickel aluminide or platinum aluminide, or a MCrAlY-type coating well known in the art. These bond coats may be especially useful when applied to a metallic substrate 102, such as a superalloy in some embodiments, a platinum modified nickel aluminide bond coat 104 may be formed on the substrate 102 and then a TBC 106 may be applied to the platinum modified nickel aluminide bond coat 104. Without intending to be limiting, the bond coat 104 may help prevent or reduce oxidation of the substrate 102, thereby also reducing spallation.

The bond coat 104 may be applied using any of various coating techniques known in the art, such as plasma spray, thermal spray, chemical vapor deposition, ion plasma deposition, vapor phase aluminide or physical vapor deposition.

The bond coat 104 may have a thickness of about 2.5 µm to about 400 µm and may be applied as an additive layer to the substrate 102 or may be diffused into the substrate giving an inhomogeneous composition which is engineered to have a gradient in properties. However, it is noted that all coating layers within the coating system 140 can vary in thickness depending on location on the part.

The thermally grown oxide layer 142 is shown on the bond coat 104. Generally, the thermally grown oxide layer 142 includes an oxide of the material of the bond coat 104. Similarly, when the bond coat 104 includes aluminum in its construction, the thermally grown oxide layer 142 may include an aluminum oxide (e.g., $Al_2O$, $AlO$, $Al_2O_3$, etc., or mixtures thereof).

In certain embodiments, the thermally grown oxide layer 142 generally has a thickness of up to about 20 µm (e.g., about 0.01 µm to about 6 µm) and can be a natural product of thermal exposures during processing of subsequent layers or can be designed to be thicker by heat treating the part. The thermally grown oxide layer 142 may not be uniform dependent on the underlying bond coat 104, processing methods, and exposure conditions.

The TBC 106 is shown on the thermally grown oxide layer 142. As illustrated, the TBC 106 may formed by any suitable process. For instance, one or more embodiments the TBCs 106 may be formed by air-plasma spray (APS), suspension plasma spray (SPS), electron beam physical vapor deposition (EBPVD), high velocity oxygen fuel (HVOF), electrostatic spray assisted vapor deposition (ES-AVD), and direct vapor deposition. APS may allow for higher deposition rates and better coverage of the surface than EBPVD. However, the porous and lamellar nature of the sprayed coating from APS may limit the performance and life of the coating. TBCs 106 fabricated via EBPVD may withstand high thermo-mechanical stresses due to the columnar structures of the layer, resulting in a strain tolerant coating. For application in a turbine, a TBC should be strongly bonded to the surface for multiple thermal cycles.

As used herein, "TBC" or "TBCs" is used to refer to stabilized ceramics that can sustain a fairly high temperature gradient such that the coated metallic components can be operated at gas temperatures higher than the metal's melting point. Although any suitable chemistry can be utilized for the TBC 106, the TBC 106 may generally include a ceramic thermal barrier material in particular embodiments. For example, suitable ceramic thermal barrier coating materials include various types of oxides, such as aluminum oxide ("alumina"), hafnium oxide ("hafnia") or zirconium oxide ("zirconia"), in particular stabilized hafnia or stabilized zirconia, and blends including one or both of these. Examples of stabilized zirconia include without limitation yttria-stabilized zirconia (YSZ), ceria-stabilized zirconia, calcia-stabilized zirconia, scandia-stabilized zirconia, magnesia-stabilized zirconia, india-stabilized zirconia, ytterbia-stabilized zirconia, lanthana-stabilized zirconia, gadolinia-stabilized zirconia, mullite stabilized zirconia, alumina stabilized zirconia, as well as mixtures of such stabilized zirconia, rare-earth oxides (e.g., $La_2O_3$, $Nb_2O_5$, $Pr_2O_3$, $CeO_2$), and metal-glass composites, and combinations thereof (e.g., alumina and YSZ or ceria and YSZ). Similar stabilized hafnia compositions are known in the art and suitable for use in embodiments described herein. Besides its high temperature stability, YSZ also has a good combination of high toughness and chemical inertness, and the thermal expansion coefficient of YSZ is a comparatively suitable match to that of the metallic components of the turbine blade being coated.

In certain embodiments, the TBC 106 includes yttria-stabilized zirconia. Suitable yttria-stabilized zirconia may include from about 1 weight percent to about 20 weight percent yttria (based on the combined weight of yttria and zirconia), and more typically from about 3 weight percent to about 10 weight percent yttria. An example yttria-stabilized zirconia thermal barrier coating includes about 7% yttria and about 93% zirconia. These types of zirconia may further include one or more of a second metal (e.g., a lanthanide or actinide) oxide, such as dysprosia, erbia, europia, gadolinia, neodymia, praseodymia, urania, and hafnia, to further reduce thermal conductivity of the thermal barrier coating material. In some embodiments, the thermal barrier coating material may further include an additional metal oxide, such as, titania and/or alumina. For example, the TBC 106 can be composed of 8YSZ, though higher $Y_2O_3$ concentrations can be utilized.

Suitable ceramic thermal barrier coating materials may also include pyrochlores of general formula $A_2B_2O_7$ where A is a metal having a valence of 3+ or 2+ (e.g., gadolinium, aluminum, cerium, lanthanum or yttrium) and B is a metal having a valence of 4+ or 5+ (e.g., hafnium, titanium, cerium or zirconium) where the sum of the A and B valences is 7. Representative materials of this type include gadolinium zirconate, lanthanum titanate, lanthanum zirconate, yttrium zirconate, lanthanum hafnate, cerium hafnate, and lanthanum cerate. Besides its high temperature stability, YSZ also has a good combination of high toughness and chemical inertness, and the thermal expansion coefficient of YSZ is a comparatively suitable match to that of the metallic components of the turbine blade being coated.

The TBC 106 may include the ceramic thermal barrier coating material in an amount of up to 100 weight percent. In some embodiments, the TBC 106 includes the ceramic thermal barrier coating material in a range from about 95 weight percent to about 100 weight percent and more particularly from about 98 weight percent to about 100 weight percent. The selected composition of the TBC 106 may depend upon one or factors, including the composition of the optional, adjacent bond coat 104 (if present) and/or thermally grown oxide layer 142 (if present), the coefficient of thermal expansion (CTE) characteristics desired for the TBC 106, and the thermal barrier properties desired for the TBC 106.

The thickness of the TBC 106 may depend upon the substrate or the component it is deposited on. In some embodiments, the TBC 106 has a thickness in a range of from about 25 micrometer (µm) to about 2000 µm. In some embodiments, the TBC 106 has a thickness in a range of from about 25 µm to about 1500 µm. In some embodiments, the thickness is in a range of from about 25 µm to about 1000 µm.

As shown, a plurality of slots 110 (of which only one is illustrated) are formed into the TBC 106. The slots 110 are generally formed locally on components to provide additional compliance and strain tolerance to prevent TBC spallation. Typically, the slots 110 are positioned between cooling holes 111, if present, and may provide additional compliance and strain tolerance. In the embodiment of FIG. 11, illustrated is a single cooling hole 111 disposed throughout the TBC 106. The cooling holes 111 are generally cylindrical elongate bodies formed in the combustion liner to provide film cooling and extend from one side of the component through to the opposite side of the component. As used herein, "elongate" refers to an aspect ratio (length/width) of greater than 1. The size, spacing, and angle of the cooling holes 111 may vary depending on the component in which they are used. Without intending to be bound by theory, the slots 110, in conjunction with the protective coating 144, can improve resistance to environmental contaminant compositions (e.g. CMAS) attack and increase component life.

As stated above, the TBC 106 is slotted to provide a balance of environmental contaminant compositions (E.G. CMAS) resistance and heat transfer resistance. Additionally, the slots 110 locally address regions of a component, for example a combustor, that are known to operate at high temperature and suffer spalling distress by CMAS fusion and infiltration. The slots 110 in the TBC 106 can be tailored to address the specific level of CMAS resistance that is required in the areas of concern. For example, deeper slots 110 can be used in regions of the TBC 106 where the TBC 106 may experience the hottest temperatures. The slots 110 disposed between cooling holes provide extra compliance and strain tolerance. Even though the region between the cooling holes may run hotter and the TBC 106 in this area may be prone to CMAS spallation degradation, the extra compliance due to the slot 100 may prevent CMAS spallation and extend component life. The TBC 106 can include one or more layers, and the orientation of the slots with respect to the diffusion of cooling air from the cooling holes may be controlled in this regard.

In particular, the slots 110 may be positioned locally in regions of high distress. For instance, certain areas of a component may be exposed to higher temperatures than surrounding areas. At these locations, the CMAS is more likely to melt and infiltrate cracks in the TBC 106. In the embodiments shown, the slots 110 are substantially continuous across the surface of the TBC 106. However, in other embodiments, the slots 110 may be discontinuous so as to bypass an area of the ceramic coating and/or a cooling hole (not shown). For example, one or more short slots may be disposed between two adjacent cooling holes.

In the embodiment illustrated in FIG. 11, the slots 110 do not extend to the thermally grown oxide layer 142, or the bond coat 104. Without wishing to be bound by any particular theory, it is believed that extending the slots 110 into the thermally grown oxide layer 142, or through the thermally grown oxide layer 142 and the bond coat 104 may, under some circumstances, detract from component life. Thus, in particular embodiments, the slots 110 may extend through the ceramic material of the TBC 106 (either partially or fully).

In particular embodiments, the slots 110 extend through about 40% to about 85% of the total thickness of the TBC 106, such as about 50% to about 85%. For example, if the total TBC thickness is about 610 µm (about 24 mils) to about 660 µm (about 26 mils), the slot depth can be about 380 µm (about 15 mils) to about 510 µm (about 20 mils). In another example, if the total TBC thickness is about 355 µm (about 14 mils) to about 406 µm (about 16 mils), the slot depth can be about 254 µm (about 10 mils) to about 305 µm (about 12 mils).

During operation of aircraft engines in environments that contain fine-scale dust, such as measured by the PM10 level, the dust can accumulate in the fine scale cooling holes and reduce the cooling efficiency. The slots 110 may provide cross flow in or near the slot. Furthermore, the slots 110 formed in the ceramic coating layer 106 provide for an increase in surface area onto which the reactive phase coating 112 is disposed. Without wishing to be bound by any particular theory, it is believed that the slots 110, in combination with the reactive phase coating 112, may thereby prevent dust deposition.

Although shown as being substantially perpendicular to the outer surface of the TBC (i.e., about 90°), the slots 110 may be formed at another angle with respect to the TBC's surface into the thickness of the TBC 106, such as about 60° to about 90°, as previously described with reference to FIGS. 9 and 10.

In an embodiment, where the component has been placed in use prior to deposition of the reactive phase coating 112, such as within a hot gas path of a gas turbine engine, the layer 108 of environmental contaminant compositions forms on the surface 107 and the sidewalls 124 (as previously described) of the TBC 106, as shown in FIG. 11. At the high turbine operating temperatures, these environmental contaminants adhere to the hot surface 107 of the TBC 106 to form the layer 108 of environmental contaminant compositions.

As shown in the embodiment of FIG. 11, a reactive phase coating 112 is formed directly on the layer 108 of environmental contaminant compositions. For example, the reactive phase coating 112 may be formed on the layer 108 of environmental contaminant compositions without any pre-washing, stripping or any other pre-treatment step. That is, the formation process can be performed without the use of any aqueous or organic precursors. In an alternate embodiment, the layer 108 of environmental contaminant compositions may be removed. In yet another alternate embodiment, the layer 108 of environmental contaminant compositions and the ceramic coating 106 may be removed, and redeposited prior to deposition of the reactive phase coating 112.

The reactive phase coating 112 generally includes at least one protective agent that is reactive with the contaminant compositions of the layer 108. Without wishing to be bound by any particular theory, it is believed that protective agent(s) of the reactive phase coating 112 are highly reactive to CMAS-type material, such that, at typical temperatures where environmental contaminant compositions (e.g. CMAS) are encountered in liquid form, the protective agent rapidly reacts with the environmental contaminant compositions to form a solid reaction product that itself is thermally and chemically stable in the presence of liquid environmental contaminant compositions, forming a solid-phase barrier against further CMAS attack to the underlying layers (e.g., to the underlying TBC layer 106).

In particular embodiments, the "protective agent" includes a substance that is reactive with the environmental contaminant compositions, and more particularly the CMAS material. More particularly, a substance is considered suitable as a substance for use in the protective agent as described herein if the substance has the characteristic property. In certain embodiments, for instance, the protective agent may chemically reacting with a nominal CMAS liquid composition at atmospheric pressure forms a solid, crystalline product that is outside the crystallization field of this nominal CMAS composition. Such a solid crystalline product may have a higher melting temperature than the nominal CMAS composition so that it remains as a solid barrier to liquid infiltration.

For the purposes of this description, the term "nominal CMAS" refers to the following composition, with all percentages in mole percent: 41.6% silica ($SiO_2$), 29.3% calcia (CaO), 12.5% alumina ($AlO_{1.5}$), 9.1% magnesia (MgO), 6.0% iron oxide ($FeO_{1.5}$), and 1.5% nickel oxide (NiO). It will be appreciated that the nominal CMAS composition given in this definition represents a reference composition to define a benchmark for the substance's CMAS reactivity in a way that can be compared to the CMAS reactivity of other substances; use of this reference composition does not limit in any way the actual composition of ingested material that becomes deposited on the coating during operation which, of course, will vary widely in service.

If a given substance is capable of reacting with molten CMAS having the above nominal composition, thereby forming a reaction product that has a melting point higher than about 1200° C., is crystalline, and is outside the crystallization field of this nominal CMAS composition, then the substance may be useful in the protective agent as described herein. A material is outside the crystallization field of the nominal CMAS composition if it is not included in the set of crystalline phases that can be formed from combinations of the component oxides of the CMAS composition. Thus, a material that includes a rare-earth element, such as ytterbium, for instance, would be outside the crystallization field of the nominal CMAS composition because none of the component oxides of the nominal CMAS includes ytterbium. On the other hand, a reactive agent that exclusively employs one or more of the other components of the nominal CMAS composition, such as aluminum oxide, would not form a product outside the crystallization field of nominal CMAS. Use of a protective agent substance that promotes formation of reaction product with CMAS outside the crystallization field of the CMAS may result in faster reaction kinetics with CMAS under some circumstances, and if reaction kinetics can be accelerated, then ingress of molten CMAS prior to reaction and solidification desirably may be reduced.

In some embodiments, the protective agent includes a rare-earth oxide, that is, an oxide compound that includes a rare-earth element as one of its constituent elements. As used herein, the terms "rare-earth" and "rare-earth element" are used interchangeably, and encompass elements of the lanthanide series, yttrium, and scandium. For example, in some embodiments, the oxide includes lanthanum, neodymium, erbium, cerium, gadolinium, or combinations including any one or more of these. Certain complex oxides, that is, oxide compounds that include more than one metal element constituent, have been shown in some circumstances to provide comparatively high reactivity with liquid CMAS. In particular embodiments, the oxide is a complex oxide that includes a rare-earth element and a transition metal element, such as zirconium, hafnium, titanium, or niobium, along with combinations of these. Zirconates, hafnates, titanates, and niobates that include lanthanum, neodymium, cerium, and/or gadolinium are examples of such complex oxide. A particular example is gadolinium zirconate. For example, the protective agents may include, in particular embodiments, alpha-$Al_2O_3$, 55YSZ, $GdAlO_3$, $SrGd_2Al_2O_7$ ("SAG"), etc., and combinations thereof.

Figure 13:
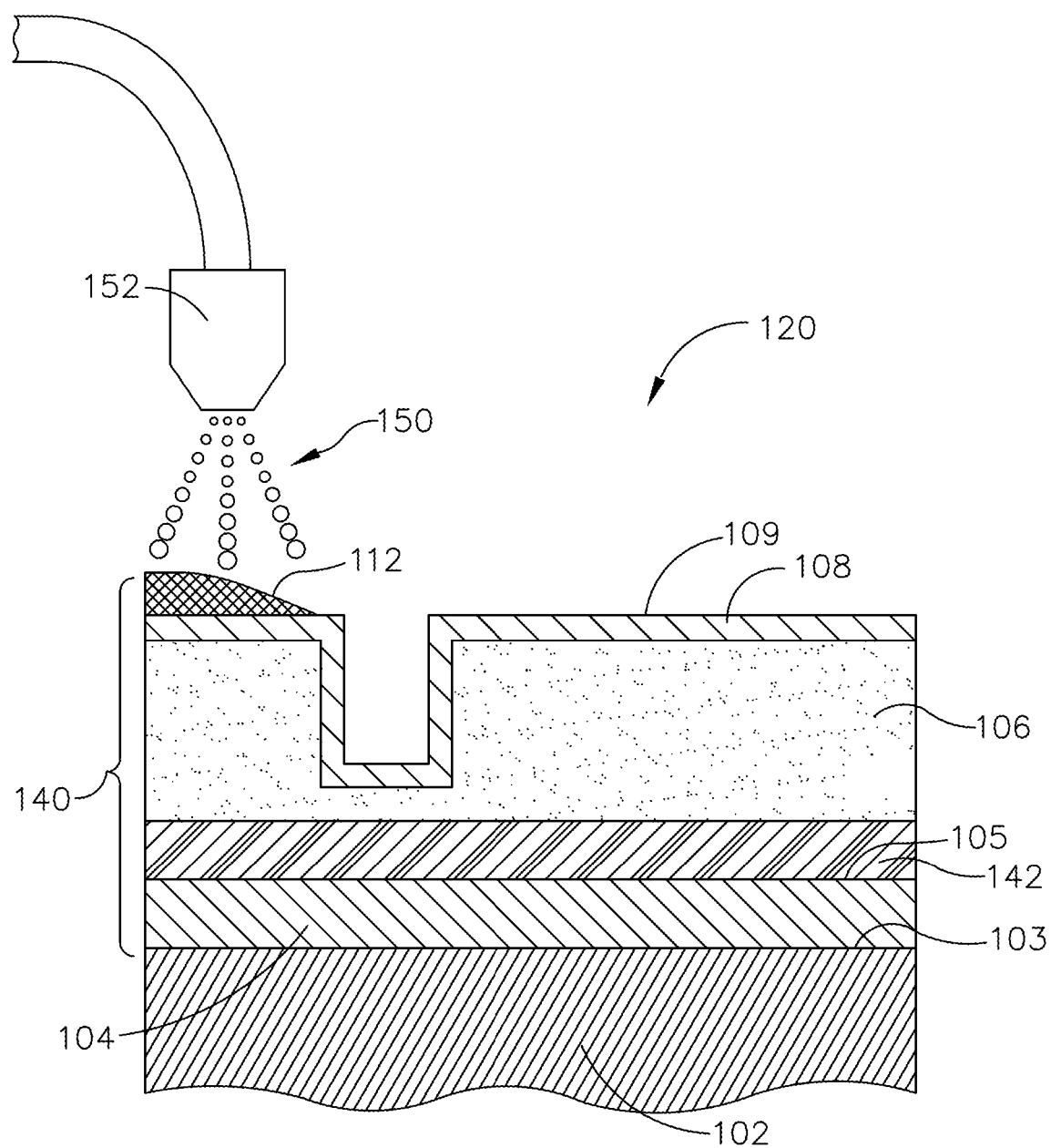
FIG. 13 illustrates an exemplary spray method for forming the reactive phase coating on a layer of environmental contaminant compositions, in accordance with one or more embodiments shown or described herein.

The reactive phase coating 112 can be formed via any suitable method. However, when performed in an on-wing restoration process (e.g., without dismantling of the turbine engine), certain practical restraints exist that inhibit the use of several traditional coating methods such as thermal spraying, flowing, dipping, etc. cannot be used. In particular embodiments, a more simple room temperature processing of the reactive phase coating 112 can be performed, such as via spraying, brushing, rolling, etc. Referring to the embodiment of FIG. 13, a plurality of ceramic oxide particles 150 are shown being sprayed from a spray head 152 to form the reactive phase coating 112 directly on the surface 109 of the layer 108 of environmental contaminant compositions. In one embodiment, the average particle size of the plurality of ceramic oxide particles 150 is less than the surface roughness (RA) of the surface 107 of the TBC 106 such that the ceramic oxide particles 200 can fill the crevasses and valleys defined within the surface 107 and the layer 108 of environmental contaminant compositions. In particular embodiments, the average particle size of the plurality of ceramic oxide particles 200 is about 90% of the surface roughness or less, such as about 1% to about 50% of the surface roughness (e.g., about 1% to about 30%). For example, if the TBC 106 is a EB-PVD coating having a surface roughness that is about 2 μm to about 2.5 μm, then the average particle size of the ceramic oxide particles 200 can be about 0.75 μm or less (e.g., about 0.1 μm to about 0.5 μm). In particular embodiments, the ceramic oxide particles 150 can have an average particle size of about 0.1 μm to about 10 μm (e.g., about 0.5 μm to about 5 μm, such as about 1 μm to about 3 μm).

In one embodiment, the reactive phase coating 112 has a microstructure formed according to its method of deposition and formation. This microstructure is not typical of any conventionally used TBC. For example, if sprayed onto the layer 108 of environmental contaminant compositions in the form of ceramic oxide particles 150, the microstructure of the reactive phase coating 112 is distinguished from other methods of formation (such as Air Plasma Spraying (APS), Electron Beam Physical Vapor Deposition (EBPVD), Suspension Plasma Spraying (SPS) or Solution Precursor Plasma spraying (SPPS)). For instance, the reactive phase coating 112 is polycrystalline (as opposed to a columnar coating formed via EBPVD that has single crystalline columns), has an equiaxed microstructure with grain size of about 2 μm without any splats (as opposed to a APS coating formed from splatted particles), without any vertical boundaries that are substantially oriented perpendicular to a surface 113 (FIG. 11) of the reactive phase coating 112 (as opposed to SPS, SPPS and high-temperature/velocity) and has porosity, as deposited, greater than 20% by volume of the reactive phase coating 112. Such a reactive phase coating 112 can be formed to any suitable porosity (e.g., a porosity of about 20% to about 50% by volume, as deposited).

Referring again to FIG. 11, as previously indicated the thickness of reactive phase coating 112 may depend upon the slot 110 dimensions and thickness of any environmental contaminants disposed thereon, so as to not bridge the slot 110 opening. As previously indicated, the thickness of the reactive phase coating 112 on the top portion 132 (FIGS. 7-10) of each of the segments 116 (FIG. 6) of ceramic coating 106 and the sidewalls 124, 128 (FIGS. 7-10) of the segments 116 is design specific. The reactive phase coating 112 must be sufficiently thick to provide CMAS resistance, but there is an upper limit to the thickness on the top portion 132 of each of the segments 116 that is different than the upper limit to the thickness on the sidewalls 124, 128 of the columnar segments to avoid bridging of the slots 110.

The thickness of reactive phase coating 112 may also depend upon the substrate or the component on which it is deposited. In one embodiment, the reactive phase coating 112 has a thickness that is greater than the surface roughness of the underlying the TBC 106, such that the reactive phase coating 112 covers all of the surface 107. For example, the surface roughness of the TBC 106 is about 1 μm to about 10 μm, in particular embodiments, and the reactive phase coating has a thickness that is greater than the surface roughness of the TBC 106 (e.g., the reactive phase coating 112 can be about 3 μm to about 50 μm). The thickness of reactive phase coating 112 may further depend upon the thickness of the underlying TBC 106 and/or layer 108 of environmental contaminant compositions, as well as the dimensions of the segments 116 present in the TBC 106.

The reactive phase coating 112 can be formed by a single application of a layer, or via multiple layers applied onto each other. In some embodiments, the reactive phase coating 112 is about 2 times to about 8 times thicker than the layer 108 of environmental contaminant compositions (i.e., the layer 108 of environmental contaminant compositions has a thickness that is about ½ to about ⅛$^{th}$ of the thickness of the reactive phase coating 112) to provide sufficient material to react with the existing environmental contaminant compositions and to serve as a protective coating for future deposits. However, in particular embodiments, the layer 108 and the reactive phase coating 112 are not thicker than about 250 μm due to the possibility that layers over about 250 μm thick are more prone to spalling. As such, in certain embodiments, when the layer 108 of environmental contaminant compositions has a thickness of about 25 μm to about 250 μm, the reactive phase coating 112 may have a thickness of about 50 μm to about 250 μm, with the reactive phase coating 112 being thicker than the layer 108 of environmental contaminant compositions.

In particular embodiments, the reactive phase coating 112 is a continuous coating that covers substantially all of the surface 109 of the layer 108 of environmental contaminant compositions or surface 107 of the ceramic coating 106 so as to avoid exposure of any particular area on the respective surface to additional CMAS attack.

Referring again to FIG. 11, in one embodiment, the reactive phase coating 112 and the layer 108 of environmental contaminant compositions form, after continued operation of the engine, the protective layer 144 formed on the TBC layer 106. The protective layer 144 has a fusion temperature that is greater than the fusion temperature of the environmental contaminant compositions in the layer 108. For example, the protective layer 144 has a fusion temperature that is about 0.1% to about 25% greater than the environmental contaminant compositions of layer 108 prior to formation of the protective layer 144, such as about a fusion temperature that is about 0.5% to about 10% greater.

Figure 12:
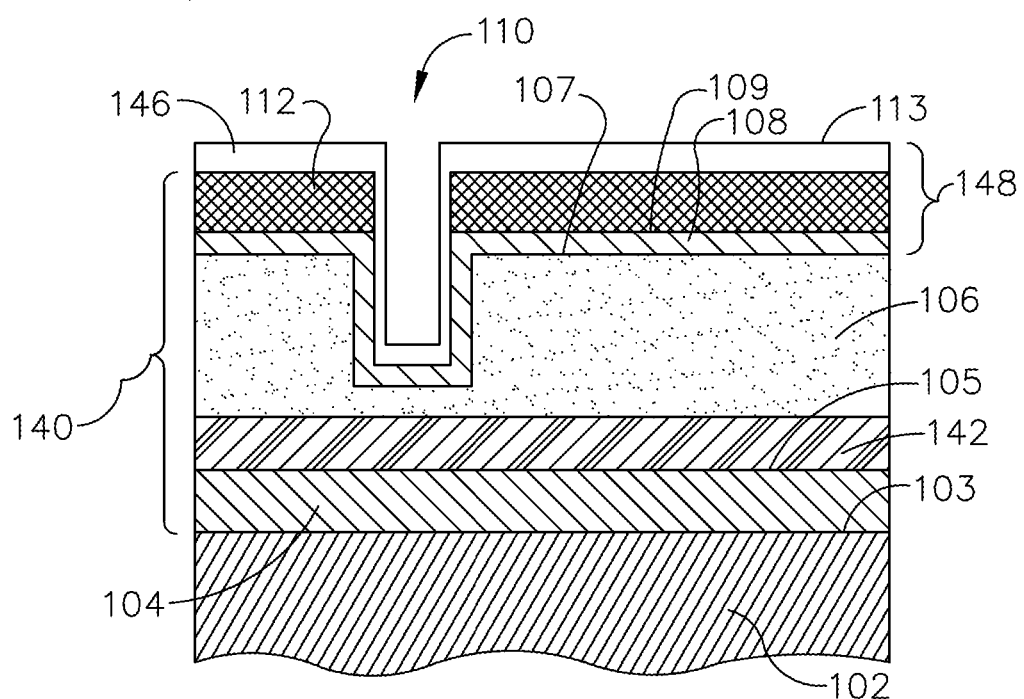
FIG. 12 illustrates the embodiment of FIG. 11 having a second layer of environmental contaminant compositions formed on the reactive phase coating, in accordance with one or more embodiments shown or described herein.

After returning to service with the reactive phase coating 112 thereon, a second layer 146 of environmental contaminant compositions may form on the exposed surfaces 113 of the reactive phase coating 112. The protective agents of the reactive phase coating 112 can react with the second layer 146 of environmental contaminant compositions to continue to form a solid crystalline product. Thus, after continued use, the layer 108 of environmental contaminant compositions, the reactive phase coating 112, and the second layer 146 of environmental contaminant compositions can form an external barrier 148 on the surface of the TBC 106, as best illustrated in FIG. 12.

Since CMAS attack is a continuous process during use of the component 120, the reactive phase coating 112 would be a consumable coating requiring refreshing. The refresh frequency depends on several conditions, such as the amount of environmental contaminants in the layer 108, the amount of future deposits on the reactive phase coating 112, the length of service of the component, etc.

As stated, the reactive phase coating 112 is particularly useful on a hot path component's surface within a turbine engine. For example, the coated components 120, 121, 122, 123 can be utilized in turbomachinery in general, including a high by-pass turbofan jet engine ("turbofan"), turbojet, turboprop and turboshaft gas turbine engines, including industrial and marine gas turbine engines and auxiliary power units. For example, the coated component components 120, 121, 122, 123 can be in the hot gas path, such as within a compressor section (e.g., compressor vanes and/or blades), a combustion section (combustion liners), or a turbine section (e.g., turbine nozzles and/or blades).

Figure 14:
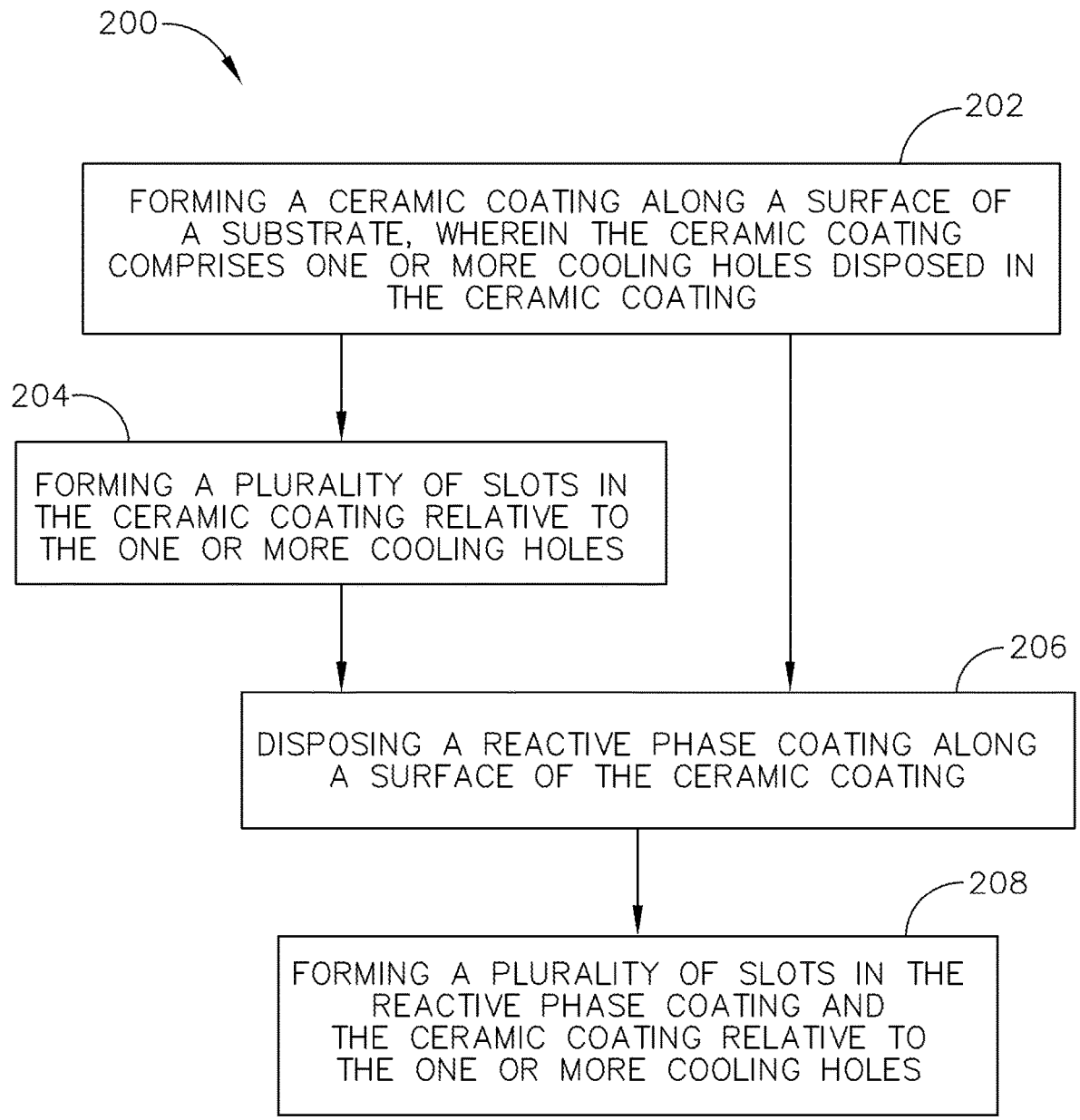
FIG. 14 is a flowchart of a method of forming a coated component, in accordance with one or more embodiments shown or described herein.

FIG. 14 is a flowchart of a method of forming a coated component in accordance with one embodiment of the present disclosure. The method 200 includes forming a ceramic coating along a surface of a substrate in a step 202, wherein the ceramic coating comprises one or more cooling holes disposed in the ceramic coating. In an embodiment the ceramic coating is a thermal barrier coating (TBC). In some embodiments, forming the ceramic coating 202 may comprise forming two or more layers of ceramic coating material along the substrate. In an embodiment, the method further includes forming a plurality of slots along the ceramic coating relative to the one or more cooling holes in a step 204 such that the plurality of slots do not pass through any of the one or more cooling holes, and wherein the plurality of slots form segments of ceramic coating material.

In some embodiments, forming the plurality of slots may comprise forming the plurality of slots in a thermal distress zone, the thermal distress zone being a zone configured to be exposed to temperatures of about 5% or higher (e.g., about 10% or higher) than another zone of the ceramic coating during operation of the component. In some embodiments, forming the plurality of slots may comprise laser-cutting, high speed mechanical saw or combinations thereof and may include forming individual slots with an aspect ratio of about 4 or more. In some embodiments, forming the plurality of slots may comprise forming individual slots with a width of about 10 microns to 100 microns and a depth of about 50 microns to about 1000 microns, depending on the thickness of the ceramic coating. In some embodiments, forming the plurality of slots may comprise forming a plurality of individual slots, each individual slot in the plurality of slots being spaced apart from another slot by about 0.25 mm to about 3 mm. In some embodiments, forming the plurality of slots may comprise forming individual slots such that the plurality of slots traverse only one layer of the ceramic coating material.

In another embodiment, the plurality of slots are formed later in the method as described herein. Next, a reactive phase coating is disposed along the exposed surfaces of the ceramic coating, having the slots formed therein, in a step 206.

As previously indicated, in an embodiment the plurality of slots may be formed in the reactive phase coating and the ceramic coating, subsequent to the deposition of the reactive phase coating, in a step 208. In an embodiment, where the component is placed into service, a layer of environmental contaminant compositions is formed on a surface of the ceramic layer prior to the deposition of the reactive phase coating.

The resulting coated component has an improved life in aggressive environments, such as those with high concentrations of airborne particulates, including dust, sand, etc. Components can experience the build-up of molten dust deposits that contain calcium oxide, magnesium oxide, alumina, and silica, generally known as CMAS. The environmental dust may be characterized by various parameters, such as the "PM10 level" (particulate matter less than 10 microns). In such environments, the prior ceramic coatings can become compromised and spall as a result of CMAS degradation. The slotted ceramic coating having a protective coating disposed thereon, as disclosed herein has an improved combination of CMAS resistance, strain tolerance, and thermal resistance. The slots are formed proximate to the film cooling holes, such as in a component of a turbine engine. The slots can improve the resistance to CMAS attack and increase component life. The geometry of the slots, the width, and the spacing of the slots may be modified to achieve the desired coating.

The combination of the protective coating and the slots may provide mechanical compliance and strain tolerance to prevent TBC spallation, such as in components that experience cycling in high temperature environments. Due to strain mismatch between ceramic coating materials and a metal substrate on cycling at very high temperatures, coatings need compliance in order to prevent cracking, buckling, and spallation during thermal cycling. The compliance has previously been provided by microstructure engineering (using pores, cracks, columnar microstructures, etc.). However, such compliance can be reduced when turbines are operated in environments where there are high dust levels, because the dust fuses and infiltrates into the ceramic coating, reducing the compliance that has been introduced by the microstructure engineering. The slots in the present coated component prevent or reduce the decrease in the ceramic coating performance due to CMAS infiltration. The slots have an additional advantage in terms of their ability to tolerate molten CMAS, as has been demonstrated and observed in test coupons after testing in cycling CMAS exposure conditions. The reactive phase coating disposed on the segments of the ceramic coating reacts with the CMAS dust and increases the fusion temperature of the CMAS and prevents infiltration of the CMAS into the segments. The protective coating and slotted ceramic coating, provides an improved balance of thermal strain tolerance, environmental resistance, increased resistance to spallation of the ceramic coating that can occur due to interactions between the molten CMAS and the ceramic coating and heat transfer performance in the distressed zones of components, such as combustors, airfoils, heat shields, etc.

While the present disclosure discusses combustor liners, the principle of the slotted ceramic coating (TBC) and protective coating to improve mechanical compliance and strain tolerance can be applied anywhere involving high temperature environments exposed to dust and particulates (e.g., high pressure turbines (HPT), low pressure turbines (LPT), high pressure compressor (HPC), low pressure compressor (LPC)). The slotted ceramic coating with reactive phase coating disposed thereon is particularly suitable for use in gas turbine engines, for example, combustor components (e.g., combustor liners), blades (including turbine and combustion airfoils), shrouds, nozzles, heat shields, and vanes.

While the invention has been described in terms of one or more particular embodiments, it is apparent that other forms could be adopted by one skilled in the art. It is to be understood that the use of "comprising" in conjunction with the coating compositions described herein specifically discloses and includes the embodiments wherein the coating compositions "consist essentially of" the named components (i.e., contain the named components and no other components that significantly adversely affect the basic and novel features disclosed), and embodiments wherein the coating compositions "consist of" the named components (i.e., contain only the named components except for contaminants which are naturally and inevitably present in each of the named components).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A coated component, comprising:
   a substrate defining a surface;
   a ceramic coating disposed on the surface of the substrate, wherein the ceramic coating defines a surface having a surface roughness; and
   a reactive phase coating disposed along the ceramic coating, wherein the reactive phase coating is comprised of a plurality of particles having an average particle size less than the surface roughness of the ceramic coating,
   wherein the ceramic coating comprises a plurality of slots disposed in a pattern in the ceramic coating forming a plurality of segments of ceramic coating material, wherein the plurality of slots have a slot depth that does not reach the underlying substrate, and wherein the plurality of slots define a plurality of columnar segments in the ceramic coating, each columnar segment defined by a top surface and a plurality of sidewalls, and wherein the reactive phase coating is applied only to the top surface of each of the columnar segments of the ceramic coating.

2. The coated component of claim 1, wherein the ceramic coating further comprises one or more cooling holes disposed in the ceramic coating and wherein the plurality of slots are disposed relative to the one or more cooling holes such that the slots do not pass through any of the one or more cooling holes.

3. The coated component of claim 1, wherein the substrate comprises a superalloy.

4. The coated component of claim 3, wherein the ceramic coating comprises yttrium stabilized zirconia, a rare earth stabilized zirconia composition, mullite, alumina, ceria, rare-earth zirconates, rare-earth oxides, metal-glass composites, or combinations thereof.

5. The coated component of claim 1, wherein the ceramic coating is a thermal barrier coating (TBC).

6. The coated component of claim 1, wherein the reactive phase coating comprises a protective agent, wherein the protective agent comprises a ceramic oxide that includes aluminum, a rare-earth element, or a mixture thereof.

7. The coated component of claim 1, wherein the reactive phase coating has a thickness that is greater than the surface roughness of the ceramic coating.

8. The coated component of claim 1, wherein each individual slot of the plurality of slots has a width of about 10 microns to 200 microns and a depth of about 50 microns to about 1000 microns.

9. The coated component of claim 1, wherein each individual slot of the plurality of slots is spaced apart from another slot by about 0.25 mm to about 3 mm.

10. The coated component of claim 1, wherein each individual slot of the plurality of slots comprises a parallel-sided slot, a slot with a V-shaped profile, a slot with a U-shaped profile, or combinations thereof.

11. The coated component of claim 1, wherein each individual slot of the plurality of slots has a ratio of depth to width of about 2 to about 15.

12. The coated component of claim 1, wherein the component is a combustion liner, shroud, nozzle, blade, heat shield, or combinations thereof.

13. The coated component of claim 1, wherein each individual slot of the plurality of slots is defined by a plurality of angled sidewalls thereby forming a V-shaped profile or a U-shaped profile.

14. A gas turbine assembly comprising the coated component of claim 1.

15. A coated component, comprising:
a substrate defining a surface;
a ceramic coating disposed on the surface of the substrate, wherein the ceramic coating defines a surface having a surface roughness;
a layer of environmental contaminant compositions on the ceramic coating; and
a reactive phase coating disposed along the ceramic coating, wherein the reactive phase coating is comprised of a plurality of particles having an average particle size less than the surface roughness of the ceramic coating, and wherein the reactive phase coating is applied directly on the layer of environmental contaminant compositions,
wherein the ceramic coating comprises a plurality of slots disposed in a pattern in the ceramic coating forming a plurality of segments of ceramic coating material, wherein the plurality of slots have a slot depth that does not reach the underlying substrate, and wherein the plurality of slots define a plurality of columnar segments in the ceramic coating, each columnar segment defined by a top surface and a plurality of sidewalls, and
wherein the reactive phase coating is applied only to the top surface of each of the columnar segments of the ceramic coating.

16. The coated component of claim 15, wherein the layer of environmental contaminant compositions comprises combinations of calcium-magnesium-alumino-silicate (CMAS).

17. The coated component of claim 15, wherein the coated component is a hot gas path component of a gas turbine engine, and wherein the reactive phase coating and the layer of environmental contaminant compositions form, after operation of the gas turbine engine, a protective layer having a fusion temperature that is greater than a fusion temperature of the environmental contaminant compositions.

18. The coated component of claim 15, wherein the ceramic coating further comprises one or more cooling holes disposed in the ceramic coating and wherein the slots are disposed relative to the one or more cooling holes such that the plurality of slots do not pass through any of the one or more cooling holes.

19. The coated component of claim 15, wherein the substrate comprises a superalloy, and wherein the ceramic coating is a thermal barrier coating (TBC).

20. The coated component of claim 15, wherein the reactive phase coating comprises a protective agent, wherein the protective agent comprises a ceramic oxide that includes aluminum, a rare-earth element, or a mixture thereof.

* * * * *